United States Patent
Sansone

[11] Patent Number: 6,160,761
[45] Date of Patent: *Dec. 12, 2000

[54] REMOVABLE AIR MANDREL

[75] Inventor: Louis E. Sansone, North Kingstown, R.I.

[73] Assignee: The United States of America as represented by the Secretary of the Navy, Washington, D.C.

[*] Notice: Under 35 U.S.C. 154(b), the term of this patent shall be extended for 423 days.

[21] Appl. No.: 08/504,233

[22] Filed: Jul. 19, 1995

[51] Int. Cl.[7] .............................. H04R 15/00; B65C 3/26

[52] U.S. Cl. ........................... 367/149; 356/358; 29/594; 428/36.91; 156/156; 156/173; 156/293

[58] Field of Search .................................. 367/149, 154, 367/20; 156/156, 173, 293; 428/36.91; 29/594; 356/358

[56] References Cited

U.S. PATENT DOCUMENTS

| | | | |
|---|---|---|---|
| 4,514,447 | 4/1985 | Boxmeyer | 428/36 |
| 4,809,243 | 2/1989 | Bledsoe et al. | 367/154 |
| 5,256,237 | 10/1993 | Maas et al. | 156/293 |
| 5,259,901 | 11/1993 | Davis et al. | 156/154 |
| 5,324,558 | 6/1994 | Muto et al. | 428/36.91 |

*Primary Examiner*—J. Woodrow Eldred
*Attorney, Agent, or Firm*—Michael J. McGowan; Prithvi C. Lall; Michael F. Oglo

[57] ABSTRACT

The present invention relates to a removable air mandrel for use in manufacturing towed sonar arrays. The removable air mandrel is used to position hydrophone mandrels and has an inflatable tubular structure which includes expansion limiters. The expansion limiters are preferably fibers incorporated into the tubular structure. A process for using the removable air mandrel to assemble a towed sonar array is also disclosed.

7 Claims, 2 Drawing Sheets

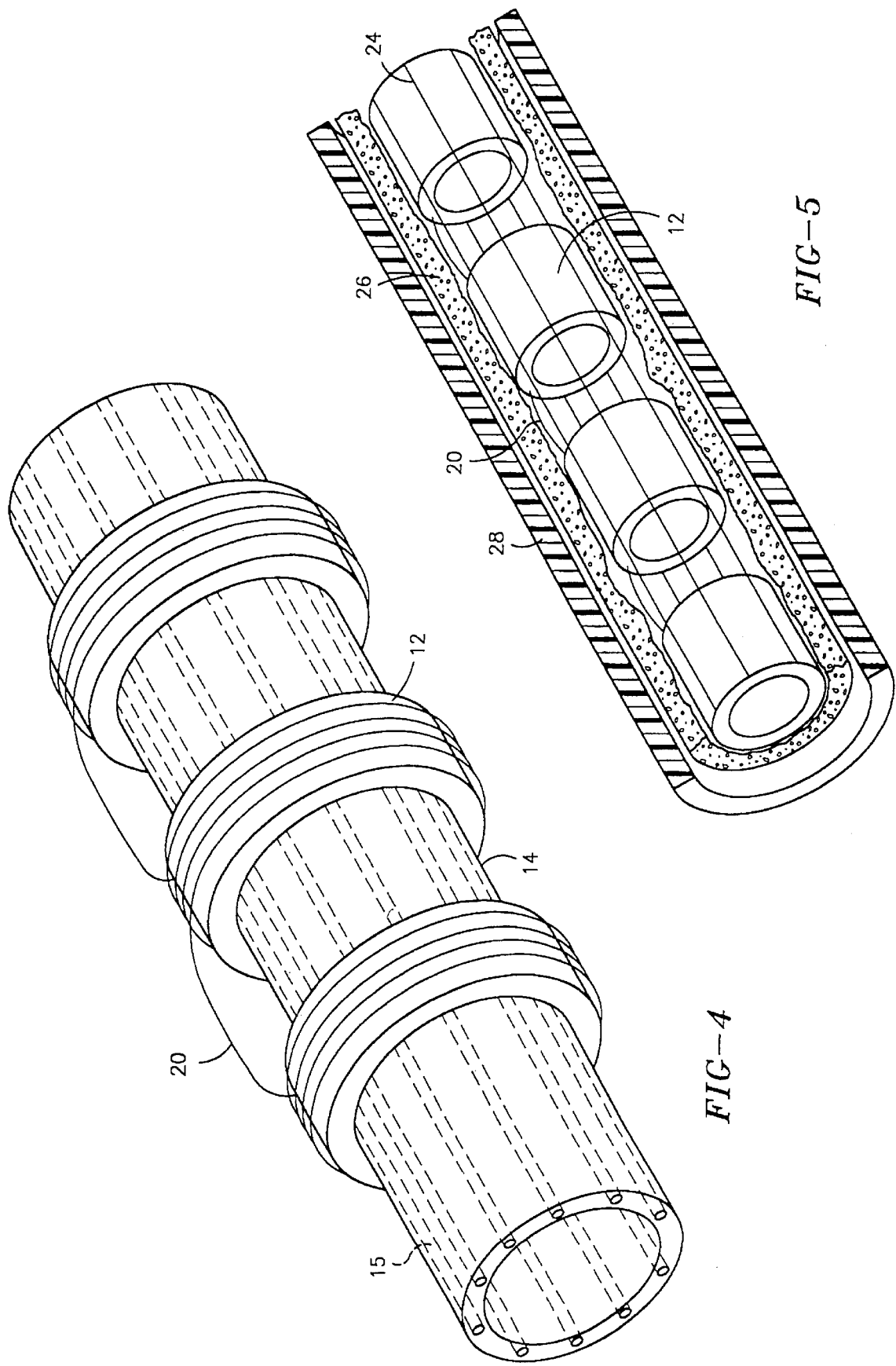

REMOVABLE AIR MANDREL

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to a removable air mandrel for use in positioning hydrophone groups in the fabrication of fiber optic towed array sonar systems and to a process for installing hydrophone mandrels into an array forming part of a sonar system.

(2) Description of the Prior Art

Inflatable mandrels have been used in a wide variety of technologies. For example, U.S. Pat. No. 3,425,642 to May illustrates an inflatable mandrel that transmits torque and radial lift to a winding roll by substantially increasing its diametrical load-carrying dimensions when inflated. The inflatable mandrel has a plurality of axially-spaced circumferentially extending tubes on a small diameter aluminum mandrel core and means for inflating the tubes so that the tubes expand radially away from the mandrel core to provide a cylindrical load-bearing surface having an outside diameter greater than the diameter of the mandrel core.

U.S. Pat. No. 4,144,632 to Stroupe exemplifies a method of making a tortuously shaped article wherein an inflatable mandrel is used as part of a single step low pressure operation. U.S. Pat. No. 4,632,328 to Bishop et al. illustrates yet another use for an inflatable mandrel. In the Bishop et al. patent, an air mandrel is described which is suitable for engaging a surface of a cylindrical object and transmitting torque and/or lifting pressure between the surface of the cylindrical object and a second concentrically figured cylindrical object also engaged by the mandrel.

U.S. Pat. No. 4,979,278 to Thompson relates to a device for axially and externally mounting an expandable sleeve onto, and dismounting the sleeve from, a cylinder. The diameter of the expandable sleeve is expanded by introducing a fluid capable of expanding the sleeve between the inner surface of the sleeve and the outer surface of the cylinder. The sleeve is contractable by the removal of the fluid.

Mandrels have also been used in the fabrication of optical fiber sensors and hydrophones. U.S. Pat. No. 5,256,237 to Maas et al. relates to a process for affixing wound optical fibers on the inner surface of a hollow cylinder. The process requires that the fibers be supported on a cylinder, coated with an adhesive and placed within the sensor mandrel cylinder, at which time the circumference of the supporting cylinder is expanded, causing the fibers to engage the inner surface of the sensor mandrel cylinder. The adhesive is then cured, holding the fibers in place on the inner surface of the sensor mandrel cylinder while the supporting cylinder is contracted and removed from the sensor mandrel cylinder.

U.S. Pat. No. 5,317,544 to Maas et al. relates to a multiple segment fiber optic hydrophone which includes a plurality of hydrophone components separated by finite spacings and interconnected to provide a single output signal. Each hydrophone component is based upon a single-mandrel design in which a cylindrical body is apportioned into sensing and reference sections. The sensing sections comprise coaxial arrangements of pliant inner and outer cylinders separated by an annular airspace while the adjacent reference sections comprise solid-walled cylinders. Finite separation distances between the hydrophone components result in reduced flow noise occasioned by increased sensing area while detection sensitivity is maintained.

Sonar based systems for detecting underwater hazards and threats employ pressure-activated transducers of the hydrophone type to generate signals indicative of the presence and location of underwater objects. In use, a sonar system utilizes a predetermined arrangement of acoustic hydrophones to collect a spatial distribution of "echo" data that can be analyzed for information such as position and closing rate. The array is housed within a hose-like element that is fixed to an end of a towing cable.

Automated winding equipment has been developed for constructing fiber optic hydrophones on long continuous mandrels. Groups of short mandrels present a problem for this type of equipment because they are simply too short to be wound by themselves and there is a need to hold various hydrophones in a predetermined spatial relationship.

Key to producing low cost fiber optic hydrophones arrays is the ability to use automated winding equipment where at one end there is a supply reel of raw material and at the other end a reel of finished product.

SUMMARY OF THE INVENTION

Accordingly, it is an object of the present invention to provide a temporary, removable mandrel which can hold short fiber optic hydrophone mandrels.

It is a further object of the present invention to provide a mandrel as above which allows for efficient use of automated winding technology.

It is still a further object of the present invention to provide a process for easily assembling and accurately positioning hydrophone groups used in the fabrication of towed array sonar systems.

The foregoing objects are attained by and through use of the removable air mandrel of the present invention. In accordance therewith, the removable air mandrel comprises an inflatable tubular structure having a hollow wall structure and means for preventing the tubular structure from expanding in a longitudinal direction during inflation for radial expansion. The preventing means comprises fibers embedded within the wall structure. The fibers may be formed from a KEVLAR material, braided steel, a VECTRAN material or a polyester material. To inflate the removable air mandrel, a variable gas pressure supply and a valve assembly are provided.

The removable air mandrel of the present invention is used in a process for installing hydrophone mandrels into an array forming part of a sonar system. The process comprises the steps of providing an inflatable tubular structure or hose having a radially expandable wall structure and means for preventing longitudinal expansion of the wall structure during inflation, and positioning hydrophone mandrels at desired locations along the hose by sliding the mandrels over the hose and partially inflating the hose so as to form a slip fit between the mandrels and the hose without causing any longitudinal displacement of the mandrels. The process further comprises fully inflating the hose to provide a tight connection between the hose and the hydrophone mandrels, winding the inflated hose and the hydrophone mandrels with optical fibers, applying an adhesive to hold the optical fibers in place, providing a protective cover over the fibers and the hydrophone mandrels, and thereafter removing the hose.

Other details of the removable air mandrel of the present invention, as well as other objects and advantages, are set

BRIEF DESCRIPTION OF THE DRAWINGS

FIG. 4 is a perspective view of an array which forms part of a sonar system with the embedded elongation limiters shown therein; and FIG. 5 is a view of an embodiment of a sonar system array.

DETAILED DESCRIPTION OF THE PREFERRED EMBODIMENT(S)

Figure 1:
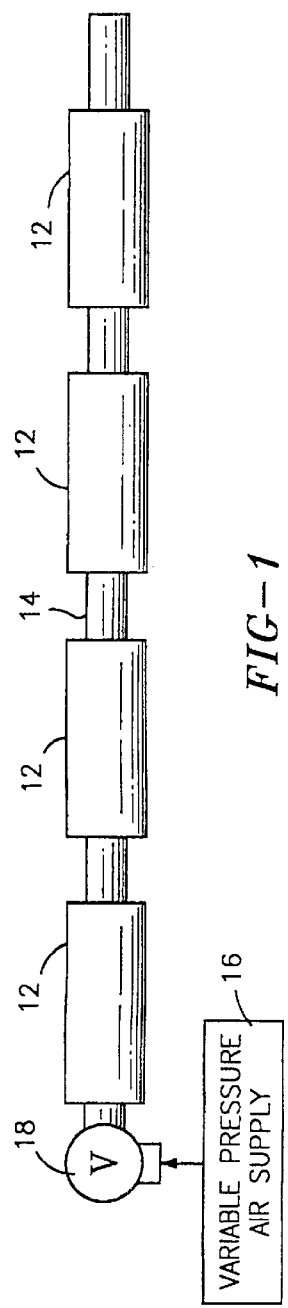
FIG. 1 is a schematic representation of hydrophone mandrels positioned along the removable air mandrel of the present invention.
Figure 2:
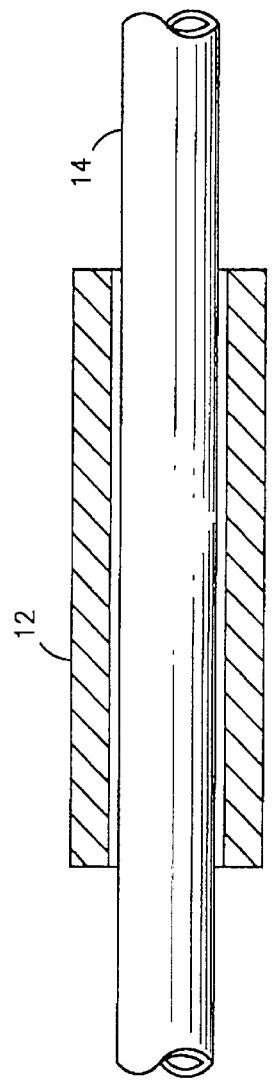
FIG. 2 is a sectional view of a portion of the system of FIG. 1 with the removable air mandrel in a deflated state.

Referring now to the drawings, FIG. 1 illustrates a plurality of hydrophone mandrels 12 positioned along a removable air mandrel or inflatable/deflatable hose assembly 14 in accordance with the present invention. The hydrophone mandrels 12 are positioned along the hose assembly or removable air mandrel 14 by sliding the mandrels 12 over the hose assembly 14 while the hose assembly is in a deflated condition. Preferably, the hydrophone mandrels 12 each have an inner diameter slightly larger than the outer diameter of the removable air mandrel 14 so as to facilitate disengagement and removal of the mandrel 14 when the mandrel 14 is in a deflated or contracted state.

The hydrophone mandrels 12 are each preferably two to three inches in length. The spacing between adjacent hydrophone mandrel is determined by a desired set of frequencies for the sonar array. It is important that the spacing between the hydrophone mandrels 12 be maintained throughout the array fabrication process. Thus, any elongation of the removable air mandrel 14 due to partial or complete inflation of the mandrel 14 has to be limited, preferably to a few percent.

As shown in FIG. 4, the removable air mandrel 14 comprises a hollow tubular hose-like structure. This structure can be made from any suitable elastomeric or polymeric material such as polyurethane. Incorporated into this structure are a plurality of longitudinally extending elongation limiters 15 for limiting the longitudinal expansion of the mandrel 14 so as not to substantially displace the hydrophone mandrels 12 along an axis substantially parallel to the longitudinal axis of the removable air mandrel 14. The elongation limiters 15 are preferably comprised of a KEVLAR cord or braided steel, although they could also be formed by a polyester material, a VECTRAN material or any other compatible material. The elongation limiters 15 are preferably incorporated into the material forming the removable air mandrel 14 during fabrication of the removable air mandrel.

As shown in FIG. 1, the removable air mandrel 14 is connected to a variable gas pressure supply 16 by valve assembly 18. Valve assembly 18 may comprise any suitable valve arrangement known in the prior art. The gas supply 16 may be an air supply or a supply of some other suitable gas.

Using the variable gas pressure supply 16 and valve assembly 18, the removable air mandrel 14 is expanded sufficiently to provide a slip fit between the removable air mandrel 14 and the hydrophone mandrels 12. This allows for easy positioning of the hydrophone mandrels along the length of the removable air mandrel 14.

Figure 3:
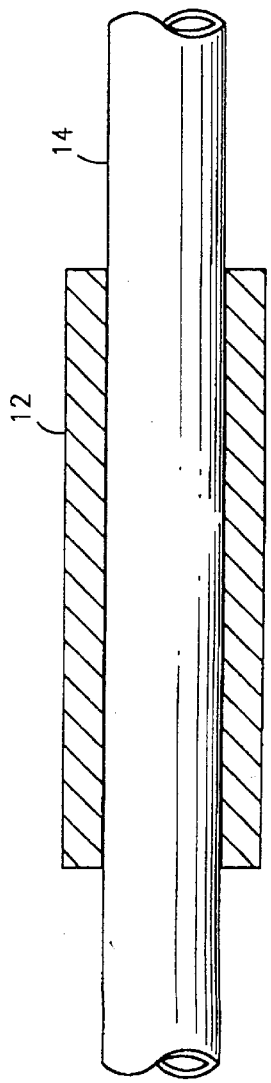
FIG. 3 is a sectional view of a portion of the system of FIG. 1 with the removable air mandrel in an inflated state.

Once the hydrophone mandrels 12 are accurately positioned, the removable air mandrel 14 is fully pressurized as shown in FIG. 3 to provide a tight connection between the mandrels 12 and the mandrel 14. This fully expanded position prevents accidental movement during the manufacturing process. The fully expanded position also offers a moderate amount of rigidity for the entire assembly which facilitates the subsequent winding of the hydrophone mandrels 12.

As previously discussed, the hydrophone mandrels 12, after and during full inflation of the removable air mandrel 14, are wound with one or more optical fibers 20 as shown in FIG. 4. The apparatus for winding the optical fiber(s) about the mandrels does not form part of the present invention. Any suitable winding apparatus known in the prior art may be used. Referring now to FIG. 5, after the optical fibers 20 are wound on the hydrophone mandrels, an additional material 26, preferably in the form of a glue or foam, is placed on the fibers for maintaining the fibers 20 in place. Between each two wound hydrophone mandrels 12, one or more optical fibers 20 may be provided for connecting the hydrophones together and placing them in communication with each other. In addition to the optical fiber(s) 20, groups of small radially spaced strings 24, preferably six, are glued to and extend between the hydrophones. The strings 24 extend in the lengthwise direction of the hydrophones and between adjacent hydrophones, allowing for a minimum amount of mechanical coupling in order to maintain alignment. The strings 24 are preferably made from KEVLAR.

The wound hydrophone mandrels 12 are then preferably pulled through a protective outer cover 28 while the removable air mandrel 14 is inflated. This process is preferably performed by hand, preferably by pulling on the removable air mandrel 14. During this pull through step, the hydrophone mandrels 12 are maintained in the desired spacing as a result of the friction established between the inflated mandrel 14 and the hydrophone mandrels 12. The protective cover 28 may comprise any suitable protective cover known in the art such as a foam material or a screen.

Once the protective cover is installed, the removable air mandrel 14 may be deflated using valve assembly 18 and removed, thus allowing mechanical decoupling of the hydrophone mandrels.

The removable air mandrel of the present invention is advantageous in that it allows very small hydrophone mandrels to be wound in a continuous fashion using existing technology. The removable air mandrel also allows discrete hydrophones to be accurately positioned relative to each other without permanent mechanical coupling which is a great source of unwanted noise.

The removable air mandrel allows hydrophone mandrels to be positioned and adjusted relative to each other along a semi-rigid central member whose gripping force is infinitely adjustable. This allows for easy assembly and repositioning before the manufacturing process and firm and permanent mandrel placement during the winding operation.

The elongation limiters 15 incorporated into the removable air mandrel allow the hydrophone mandrels to be placed in position while the removable air mandrel is only partially expanded and not change position during the final clamp up.

The removable air mandrel allows the assembly of delicate fiber optic hydrophones to be pulled into a rugged outer hose assembly without any strain to the outer surface of the hydrophones.

If desired, the removable air mandrels may be formed from a material which dissolves in the presence of a solvent. Thus, the mandrel 14 could be left in the final assembly and then the assembly could be filled with a solvent that dissolves it, thus eliminating the need to manually remove the mandrel 14.

It is apparent that there has been provided in accordance with this invention a removable air mandrel which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A process for installing hydrophone mandrels into an array forming part of a sonar system, said process comprising the steps of:

providing an inflatable hose having a radially expandable wall structure and means for preventing longitudinal expansion of said wall structure during inflation;

positioning hydrophone mandrels at desired locations along said hose to obtain a desired frequency;

said positioning step comprising sliding said hydrophone mandrels over said hose and partially inflating said hose so as to provide a slip fit between the mandrels and the hose without causing any longitudinal displacement of the mandrels; and fully inflating said hose so as to provide a tight connection between said hose and said hydrophone mandrels without causing substantially any longitudinal displacement of the mandrels.

2. The process of claim 1 further comprising:

winding said inflated hose and said positioned hydrophone mandrels with optical fibers; and adding an adhesive material to said fibers to hold said fibers in place.

3. The process of claim 2 further comprising:

providing a protective cover over said fibers and said hydrophone mandrels.

4. The process of claim 3 wherein said cover providing step comprises pulling said optical fibers and said mandrels through a protective outer cover while said hose is inflated.

5. The process of claim 3 further comprising:

deflating said hose and removing said hose.

6. The process of claim 5 wherein said removing step comprises pulling said hose out of said sonar system.

7. The process of claim 3 further comprising removing said hose from said array, said removing step comprising filling said hose with a solvent which dissolves the hose.

* * * * *